(12) United States Patent
Ito et al.

(10) Patent No.: US 6,814,033 B2
(45) Date of Patent: Nov. 9, 2004

(54) TEMPERATURE SENSITIVE FLUID TYPE FAN COUPLING APPARATUS

(75) Inventors: Haruyasu Ito, Fuji (JP); Satoshi Kubota, Shizuoka-Prefecture (JP); Masato Yamada, Mishima (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 10/189,069

(22) Filed: Jul. 2, 2002

(65) Prior Publication Data

US 2003/0012662 A1 Jan. 16, 2003

(30) Foreign Application Priority Data

Jul. 3, 2001 (JP) ........................................ 2001-201937

(51) Int. Cl.[7] ................................................. F01P 7/02
(52) U.S. Cl. ................. 123/41.12; 417/228; 192/681.1; 192/58.61
(58) Field of Search ...................... 417/228; 123/41.12; 192/82 T, 58.61, 58.681, 113.21

(56) References Cited

U.S. PATENT DOCUMENTS 5,101,949 A  *  4/1992  Takikawa et al. ......... 192/58.61
5,501,183 A  *  3/1996  Takayama ................. 123/41.12
5,575,368 A  * 11/1996  Kikuchi et al. ............ 192/58.3
5,701,985 A  * 12/1997  Martin ................... 192/58.681
6,125,981 A  * 10/2000  Ito et al. .................. 192/58.61

FOREIGN PATENT DOCUMENTS

JP            63-21048         2/1988

* cited by examiner

Primary Examiner—Cheryl J. Tyler
(74) Attorney, Agent, or Firm—Gerald E. Hespos; Anthony J. Casella

(57) ABSTRACT

A temperature sensitive fluid type fan coupling apparatus obtains linear characteristics without spoiling the drag performance. The fan coupling apparatus has a sealed case divided by a partition into an oil reservoir chamber and a torque transfer chamber. A valve is adapted to open and close an outflow regulating port in the partition in accordance with external ambient temperature. A driving disk is in the torque transfer chamber, and the transfer of torque is controlled by increasing and decreasing an effective contact surface of the oil with the driving disk. An idle oil reservoir chamber is formed in a hollow inner portion of the driving disk. A communication port is made in a side wall of the oil reservoir chamber and communicates with the torque transfer clearance. The communication port is closer to an inner circumference of the torque transfer chamber.

5 Claims, 5 Drawing Sheets

TEMPERATURE SENSITIVE FLUID TYPE FAN COUPLING APPARATUS

BACKGROUND OF THE INVENTION

1. Field of the Invention

This invention relates to a temperature sensitive fluid type fan coupling apparatus adapted to constantly supply cooling air to an engine at such a cooling air supply rate that is in accordance with the traveling condition by controlling the rotation of an engine cooling fan generally in an automobile.

2. Description of the Related Art

This kind of related art fan coupling apparatus is generally of a system in which the driving torque of a driving disk is transferred to a case by an oil supplied to a torque transfer chamber. The known structures of this kind of fan coupling apparatus include, for example, a structure of the temperature sensitive fluid type fan coupling apparatus (refer to Japanese Patent Publication No. 21048/1988) in which the interior of a sealed case is divided by a partition into a torque transfer chamber and an oil reservoir chamber, a driving disk being provided in the torque transfer chamber so that the driving disk can be rotated by a driving force of a driving unit, the oil in the oil reservoir chamber being supplied to the torque transfer chamber from an outflow regulating port formed in the partition or a cover, the oil in the torque transfer chamber being returned to the oil reservoir chamber from an oil circulating passage. According to this kind of fan coupling apparatus, the driving torque of the driving disk is transferred to the case by the oil supplied from the oil reservoir chamber to the torque transfer chamber, and a fan fixed to the case is rotated, the cooling of, for example, an engine of an automobile being thereby done. This kind of fan coupling apparatus is adapted to detect the atmospheric temperature by a strip of fancy paper-like or spiral bimetal, and increase the degree of opening of the outflow regulating port when this temperature increases. Thus, the quantity of the oil in the torque transfer chamber is increased, and a rotational frequency of the case is heightened to thereby rotate the fan at a high speed and improve the cooling effect.

However, this kind of fan coupling apparatus has problems which will be described below.

Namely, when the engine is restarted with a large quantity of oil existing in the torque transfer chamber, or when the engine is accelerated suddenly while the vehicle travels, an increase in a rotational frequency of the case (cooling fan) on the driven side also occurs, though for a short period of time, following up the acceleration of the driving disk on the driving side due to the oil existing in large quantities in the torque transfer chamber. This phenomenon is generally called a "drag" phenomenon, and causes the noise of a fan and an unpleasant feeling attended therewith. Also, an engine output is absorbed, and fuel consumption is deteriorated.

The fan coupling apparatuses which eliminate such a "drag" include, for example, a fan coupling apparatus (Japanese Patent Publication No. 21048/1988) in which an oil flowing out from a supply port made in a partition is once guided to a diametrically opposite side and then supplied to the interior of a torque transfer chamber, a fan coupling apparatus in which a driving disk is formed to a hollow structure with an auxiliary oil reservoir chamber (idle oil reservoir chamber) provided therein, or a fan coupling apparatus of a system in which a large quantity of air-generating fan is operated at a low rotational speed, and a similar fan coupling apparatus.

However, a related art temperature sensitive fluid type fan coupling apparatus had drawbacks which will be described below.

FIG. 3 illustrates a general related art fan coupling apparatus, which is formed by dividing the interior of a sealed case 111 by a partition 114 into a torque transfer chamber 112 and an oil reservoir chamber 113, and mounting in the torque transfer chamber 112 a driving disk 115 of a solid structure rotatably on a rotary shaft body 116, which is rotated by a driving force of a driving unit (not shown); via a bearing 117 so that a torque transfer clearance 112-1 is formed between the driving disk 115 and an inner circumferential surface of the torque transfer chamber 112, an oil in the oil reservoir chamber 113 being supplied from an outflow regulating port 114-1 provided in the partition 114 into the torque transfer chamber 112 by a valve member 118 operated in accordance with variation of an external ambient temperature, the oil in the torque transfer chamber 112 being returned to the oil reservoir chamber 113 through a circulating passage 121. A reference numeral 119 denotes a dam provided on the portion of an inner circumferential surface of the sealed case 111 which is opposed to an outer circumferential surface of the driving disk 115 on which outer circumferential surface the oil is collected during the rotation of the same disk, and 120 a temperature sensitive member (bimetal) provided on the outer side of the sealed case 111.

However, in the fan coupling apparatus of such a structure, the oil flowing out of the outflow regulating port 114-1 of the partition 114 resides in a space 112-2 on the front side of the torque transfer clearance 112-1, and continues to reside (stagnate) in this space until the quantity of oil attains a level high enough to obtain a pressure (water head of the oil) which permits the oil to flow into the torque transfer clearance 112-1, and which occurs owing to a centrifugal force, or until the temperature of the oil increases to cause the viscosity thereof to lower. This residing oil continued to flow into the torque transfer clearance 112-1 even when the oil existing on the side of an outer circumference of the torque transfer clearance 112-1 started being discharged toward the oil reservoir chamber 113 by the dam 119 at the time of acceleration and starting of an engine, and effected the transfer of the torque. This caused the "drag" phenomenon mentioned above, and a delay of operation. Since this residing oil existed, a large total quantity of oil was needed.

FIG. 4 and FIG. 5 illustrate fan coupling apparatuses provided with an auxiliary oil reservoir chamber (idle oil reservoir chamber) by forming a driving disk to a hollow structure. Out of these fan coupling apparatuses, the fan coupling apparatus shown in FIG. 4 is formed in the same manner as the fan coupling apparatus shown in FIG. 3, except that a driving disk is made hollow. The fan coupling apparatus of FIG. 4 is formed by dividing the interior of a sealed case 111 into a torque transfer chamber 112 and an oil reservoir chamber 113 by a partition 114, and mounting rotatably in the torque transfer chamber 112 a driving disk 145, which has an idle oil reservoir chamber 145-1 formed by making an inner portion of the disk 145 hollow, communication port 145-2, which communicates with the torque transfer chamber 112, in a side wall of the same disk and a centrifugal valve 145-3 adapted to open and close the communication port, on a rotary shaft body 116, which is rotated by a driving force of a driving unit (not shown), via a bearing 117 so that a torque transfer clearance 112-1 is formed between the driving disk 145 and an inner circumferential surface of the torque transfer chamber 112, the oil in the oil reservoir chamber 113 being supplied from the outflow port 114-1 provided in the partition 114 into the torque transfer chamber by the valve member 118 which is operated in accordance with variation of an external ambient temperature, the oil in the torque transfer chamber 112 being thereby returned to the oil reservoir chamber 113 through a circulating passage (not shown), a guide member 114-2 for introducing the oil in the oil reservoir chamber 113 directly into the idle oil reservoir chamber 145-1 being provided on the partition (refer to Japanese Patent Publication No. 28778/1984). Namely, this fan coupling apparatus has a system in which the oil flowing out from the outflow regulating port 114-1 during an operation of the apparatus is introduced into the idle oil reservoir chamber 145-1, and then supplied from the communication port 145-2 into the torque transfer clearance 112-1 via the centrifugal valve 145-3.

However, in the case of the fan coupling apparatus shown in FIG. 4, an excess oil resides in the idle oil reservoir chamber 145 at the time of a low-speed input rotation at which the centrifugal valve 145-3 is not effective. When the speed of input rotation increases in this condition to cause the centrifugal valve 145-3 to be opened, the excess oil continues to flow into the torque transmission clearance 112-1 to cause a "drag" phenomenon and an operation delay and the like in the same manner as in the above-described case. Due to the existence of the excess oil, a large total quantity of oil was needed.

The fan coupling apparatus shown in FIG. 5 is formed in the same manner as the fan coupling apparatus shown in FIG. 4, i.e., by dividing the interior of a sealed case 111 into a torque transfer chamber 112 and an oil reservoir chamber 113 by a partition 114, and mounting rotatably in the torque transmission chamber 112 a driving disk 245, which has an idle oil reservoir chamber 245-1 formed by making an inner portion of the disk 245 hollow, and communication port 245-2, which communicates with the, torque transfer chamber 112, in a side wall of the same disk, on a rotary shaft body 116, which is rotated by a driving force of a driving unit (not shown), via a bearing 117 so that a torque transfer clearance 112-1 is formed between the driving disk 245 and an inner circumferential surface of the torque transfer chamber 112, the oil in the oil reservoir chamber 113 being supplied from the outflow port 114-1 provided in the partition 114 into the torque transfer chamber 112 by the valve member 118 which is operated in accordance with variation of an external ambient temperature, the oil in the torque transfer chamber 112 being thereby returned to the oil reservoir chamber 113 through a circulating passage (not shown)(refer to Japanese Patent No. 2775431). This fan coupling apparatus is provided with a mechanism for taking the oil in the disk when an engine is stopped, and minimizing the residing oil on a transfer surface when the engine is started, so that the apparatus is effective for only the prevention of the occurrence of a "drag" phenomenon at the engine starting time.

However, in the case of this fan coupling apparatus, the oil flowing out of the outflow regulating port 114-1 of the partition 114 resides in a space 112-3 on the front side of the torque transfer clearance 112-1, and continues to reside (stagnate) in this space in the same manner as in the fan coupling apparatus shown in FIG. 3, until the quantity of oil attains a level high enough to obtain a pressure (water head of the oil) which permits the oil to flow into the torque transfer clearance 112-1, and which occurs owing to a centrifugal force, or until the temperature of the oil increases to cause the viscosity thereof to lower. This residing oil continued to flow into the torque transfer clearance 112-1 even when the oil existing in the portion of the torque transfer clearance 112-1 which is on the side of an outer circumference thereof started being discharged toward the oil reservoir chamber 113 by a dam (not shown) at the time of acceleration and starting of an engine, and effected the transfer of the torque. This caused a "drag" phenomenon mentioned above, and an operation delay. Since this residing oil existed, a large total quantity of oil was needed.

A fan coupling apparatus similar to that shown in FIG. 5 has been proposed (refer to Japanese Patent Laid-Open No. 17849/1994) which is provided with a mechanism for preventing a drag at the engine starting and accelerating time by taking an oil in a driving disk when the engine is started and accelerated. However, in this fan coupling apparatus, it is difficult to completely recover the oil in the disk in a short accelerating time. Moreover, the oil which flowed out from the outflow regulating port of the partition resides in a space in front of the torque transfer clearance in the same manner as in the fan coupling apparatus shown in FIG. 3. Therefore, this fan coupling apparatus disclosed in the publication does not provide sufficient measures to prevent drag occurring at the time of acceleration of the engine, and also causes an operation delay. Further more, since excess oil exists, a large total quantity of oil was needed.

As described above, in the related art fan coupling apparatus, the oil which flowed out from the outflow regulating port of the partition resides (stagnates) in a space in front of the torque transfer clearance until the quantity of oil attains a level high enough to obtain an admission pressure, which occurs due to a centrifugal force, with respect to the torque transfer clearance, or until the viscosity of the oil decreases. Therefore, unless the residing (excess) oil exists sufficiently in the space in front of the torque transfer clearance, the oil does not flow thereinto, so that the necessary fan rotation control characteristics cannot be obtained. On the other hand, this residing (excess) oil caused a drag and an operation delay.

Namely, even when the valve member is operated due to the temperature-deformation of a temperature sensitive body, such as a bimetal and an electromagnetic control action transmitted thereto from the outside, the time for obtaining a predetermined rotational frequency of a fan is delayed since the oil resides in the space in front of the torque transfer clearance as mentioned above, and the behavior of the fan becomes unstable due to the variation of the viscosity of the oil ascribed to the self-heating thereof and external heat transmitted thereto as mentioned above.

Under the circumstances, the inventor of the present invention previously proposed (Japanese Patent Application No. 42269/2001) so as to solve such problems encountered in the related techniques a temperature sensitive fluid type fan coupling apparatus capable of eliminating a drag phenomenon at the engine starting and accelerating time by preventing the residence of the oil in the space in front of the torque transfer clearance, capable of preventing an operation delay even when the residence of the oil does not occur, and capable of stably controlling (stabilizing the temperature characteristics) the rotation of the fan with respect to a temperature indication.

This temperature sensitive fluid type fan coupling apparatus is a temperature sensitive fluid type fan coupling apparatus in which the interior of a sealed case which is supported via a bearing on a rotary shaft body having a driving disk mounted firmly on a front end portion thereof, and which has a cooling fan fixed to an outer circumferential portion thereof, is divided by an oil outflow regulating port-carrying partition into an oil reservoir chamber and a torque transfer chamber in which the driving disk is housed therein, the portion of an inner circumferential surface of the sealed case which is opposed to an outer circumferential surface of the driving disk on which the oil is collected when the driving disk is rotated being provided with a dam, and defining a circulating flow passage joined to the dam and extending from the torque transfer chamber to the oil reservoir chamber, a valve member adapted to open the outflow regulating port of the partition when an external ambient temperature exceeds a predetermined level, and close the same when the external ambient temperature is not higher than the predetermined level being provided in the interior of the sealed case so that the valve member is operated in accordance with the deformation, which occurs due to temperature variation, of a temperature sensitive body provided on an outer surface of a cover, the transfer of torque from the rotary shaft body to the sealed case on the driven side being controlled by increasing and decreasing an effective contact area of the oil in a torque transfer clearance provided between opposed surfaces of the driving disk and sealed case, the interior of the driving disk being formed into an idle oil reservoir chamber by making the driving disk hollow, an oil circulating device for communicating the idle oil reservoir chamber and torque transfer chamber with each other being provided by making at least one communication port, which communicates with the torque transfer chamber, in a side wall or an outer circumferential wall of the driving disk, the characteristics of this apparatus residing in that it is rendered possible to give a high centrifugal force by passing the oil flowing out from the outflow regulating port of the partition during an operation of the apparatus through the interior of the portion of the disk which is on the side of an input shaft rotating at a high speed, obtain a large water head with a smaller quantity of oil by forming an inner circumferential surface structure of the idle oil reservoir chamber of the disk into a radial or helical groove-carrying smaller-diameter inner: circumferential surface structure, and make the oil in the disk flow stably directly into the torque transfer clearance, the gist of the apparatus residing in providing the driving disk and/or partition with a mechanism for introducing the oil in the oil reservoir chamber from the outflow regulating port of the partition directly into the hollow driving disk, providing the driving disk with at least one oil circulating groove for the oil introduced into the disk in an inner circumferential surface thereof, forming the disk to a structure having a smaller-diameter inner circumferential surface so that a quantity of the oil therein is at a required minimum level for driving the disk, and providing the circulating groove with a communication port communicating with the torque transfer clearance.

In the case of this fan coupling apparatus, the oil flowing out from the outflow regulating port of the partition flows into the interior of the portion of the driving disk which is on the side of the input shaft, which is rotated at a high speed, to cause a higher centrifugal force to be given to the oil. Therefore, the oil obtains a high pressure stably, and the oil in the driving disk enters the torque transfer clearance easily without residing in the disk, in accordance with the high-speed rotation of the disk even when an excess oil does not exist. Accordingly, the oil does not substantially reside in the driving disk. This can prevent a drag phenomenon at the engine starting and accelerating time and an operation delay. Since the controlling of the rotation of a fan does not depend upon the residing oil (excess oil), the responsibility of the apparatus with respect to the indication of a temperature is improved, and controlling (stabilizing the temperature characteristics) the rotation of the fan becomes possible. Moreover, the residing oil (excess oil) does not substantially exist, and the driving disk has such a small-diameter inner circumferential surface that enables the quantity of the oil in the idle oil reservoir chamber to be at a required minimum level. Therefore, this fan coupling apparatus may use a smaller total quantity of oil, and has other excellent effects.

However, when the communication port provided in the circulating groove in the above-described temperature sensitive fluid type fan coupling apparatus is positioned on the outer circumferential side of the torque transfer unit, the oil flowing through the interior of the disk and into the torque transfer unit is immediately returned to the oil reservoir chamber via the circulating passage due to the dam with the oil not existing in the torque transfer unit while transferring suitable torque to the same unit. This gives rise to a problem of proving that it is not easy to make drag performance and linear characteristics (stage-less temperature characteristics) stand together.

The temperature sensitive characteristics (relation between a rotational speed of the fan and an oil supply rate and an oil recovery rate at various temperatures) of a related art general ON/OFF type temperature sensitive fluid type fan coupling apparatus are shown in FIG. 6. This drawing shows the characteristics obtained when an input level is constant. Referring to this drawing, a zone on the upper right side of the straight line indicative of an oil recovery rate is a discontinuous zone, and a zone on the lower left side of the straight line indicative of an oil recovery rate a linear zone. Namely, in the case of an ON/OFF type fan coupling apparatus, a rotational frequency of a fan suddenly increases or decreases even when temperature variation does not occur, so that this caused (1) noise of the fan due to discontinuous temperature variation, (2) a sudden fluctuation of a load on a fan driving system due to the discontinuous variation of consumption horsepower of the fan, and (3) a decrease in the fuel consumption due to the occurrence of excess air quantity.

On the other hand, the above-described temperature sensitive fluid type fan coupling apparatus which the inventor of the present invention previously proposed is provided with a counterweight fixed to a front end of the valve member so as to obtain the linear characteristics. The utilization of the centrifugal force of this counterweight causes the valve member to be closed owing to the effect of the centrifugal force, and the quantity of the oil to be restricted when a fan-side (output/driven side) portion comes to be rotated at a high speed. This enables the rotational frequency of the fan to be set proper, and the linear characteristics to be thereby obtained in the whole zone (FIG. 7). However, when the rotational speed of the fan is low with the oil supply rate lower than the oil recovering capacity, the generated torque depends upon a distance over which the oil passes through the torque transfer unit.

However, when the communication port provided in the circulating groove is positioned in the outer circumferential portion of the torque transfer unit, approximately the whole quantity of oil is returned from the circulating passage to the oil reservoir chamber, though a suitable quantity of oil flows into the disk owing to the centrifugal force of the counterweight. Therefore, it is difficult that the drag performance and linear characteristics (stage-less temperature characteristics) stand together, and they become discontinuous. As a result, the noise of the fan becomes a problem, and the driving horsepower is used wastefully.

SUMMARY OF THE INVENTION

The present invention has been made so as to solve such problems, and provides a temperature sensitive fluid type fan coupling apparatus capable of obtaining linear characteristics easily without spoiling the drag performance thereof by providing a communication port in a proper position in a wall of an idle oil reservoir chamber of a driving disk.

The temperature sensitive fluid type fan coupling apparatus has a sealed case supported via a bearing on a rotary shaft body on a front end portion of which a driving disk is mounted firmly, the interior of the sealed case being divided by a partition, which has an oil outflow regulating port therein, into an oil reservoir chamber and a torque transfer chamber in which the driving disk is housed, a circulating flow passage being formed which extends from the torque transfer chamber, which is joined to a dam provided on a part of an inner circumferential wall surface of the sealed case, to the oil reservoir chamber, a valve member being provided which is adapted to open the outflow regulating port of the partition when an external ambient temperature exceeds a set level, and close the same port when the external ambient temperature is not higher than the set level, the transfer of rotary torque from the rotary shaft body toward the closed case on the driven side being controlled by increasing and decreasing an effective contact area of the oil in the driving disk and a torque transfer clearance, the characteristics of this apparatus residing in that a side wall of an idle oil reservoir chamber, which is formed by making an inner portion of the driving disk hollow, is provided with at least one communication port communicating with the torque transfer clearance, a mechanism in which the oil in the oil reservoir chamber is introduced from the outflow regulating port of the partition directly into the interior of the idle oil reservoir chamber, the communication port being provided in a position satisfying the following conditions:

$$0.05L < d < 0.4L$$

wherein $L = R_{out} - R_{in}$; d is a distance between an inner diametrical position of the torque transfer clearance and an axis of the communication port; $R_{out}$, a radius of an outer circumference of the driving disk; and $R_{in}$, a radius of an inner diametrical position of the torque transfer clearance.

Namely, the present invention has characteristics of providing the communication port in the side wall of the idle oil reservoir chamber of the driving disk in the portion of the torque transfer unit which is closer to the inner circumference thereof. The reason is that, when the communication port are is provided in the portion of the torque transfer unit which is closer to the inner circumference thereof, a distance over which the oil flowing out from the communication port flows to the circulating passage communicating with the oil reservoir chamber becomes long to enable torque corresponding to a suitable quantity of oil supplied from the oil reservoir chamber to be generated.

Further, the reasons why the communication port is provided in the position satisfying the above-mentioned conditions are as follows.

Namely, a distance d between a position in an inner circumferential portion of the torque transfer clearance and the axis of a communication port is set to a level in the range of 0.05L to 0.4L for the following reasons. When this distance is shorter than 0.05L, the oil flowing out into the torque transfer clearance flows necessarily into a space on the inner side of this clearance, and there is the possibility that the oil collected in this space deteriorates the drag characteristics. On the other hand, when the distance d exceeds 0.4L, the operation is put in an ON/OFF state in a high input rotation region to cause the linear characteristics to be deteriorated. In view of these facts, a range of 0.1L to 0.3L is specially preferable. Namely, when the mentioned distance is at a level in this range, the oil flows into the torque transfer clearance stably, and the linear characteristics are obtained in the whole input rotational zone.

DESCRIPTION OF THE PREFERRED EMBODIMENTS

Figure 1:
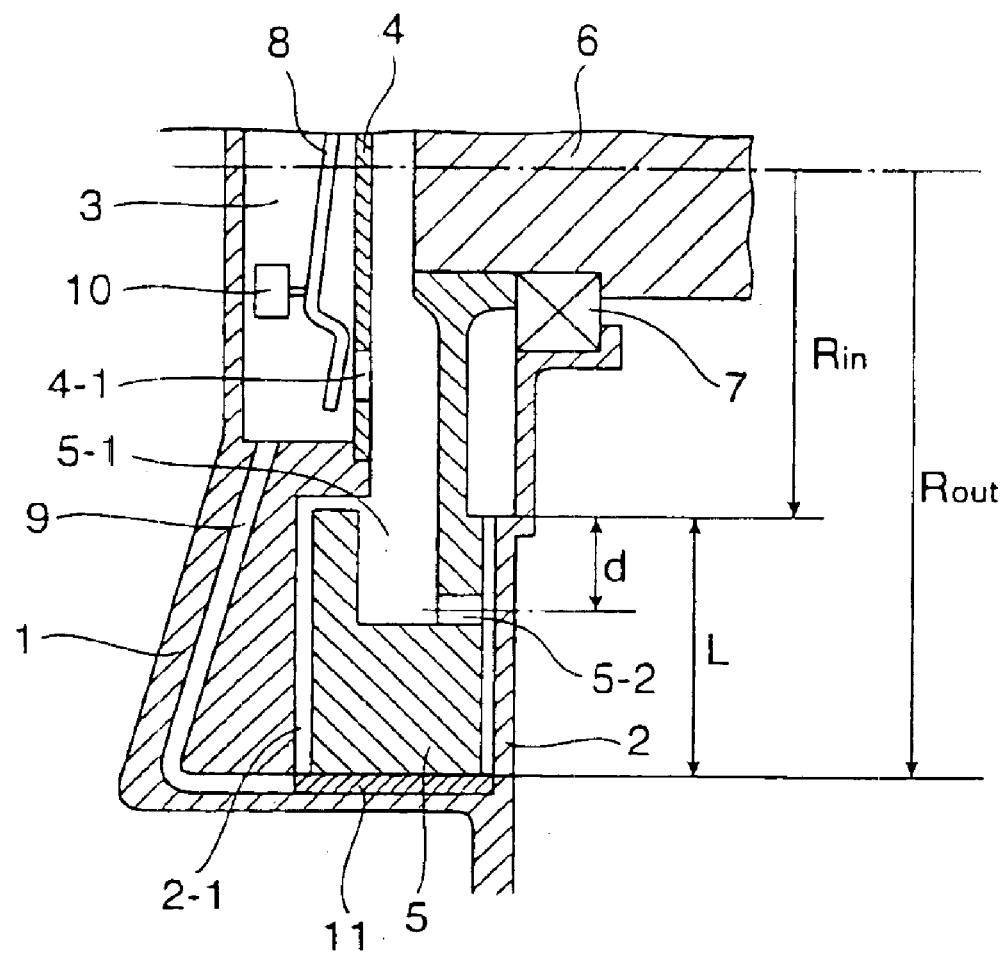
FIG. 1 is a longitudinally sectioned side elevation showing a basic construction of a principal portion of the temperature sensitive fan coupling apparatus according to the present invention.
Figure 2:
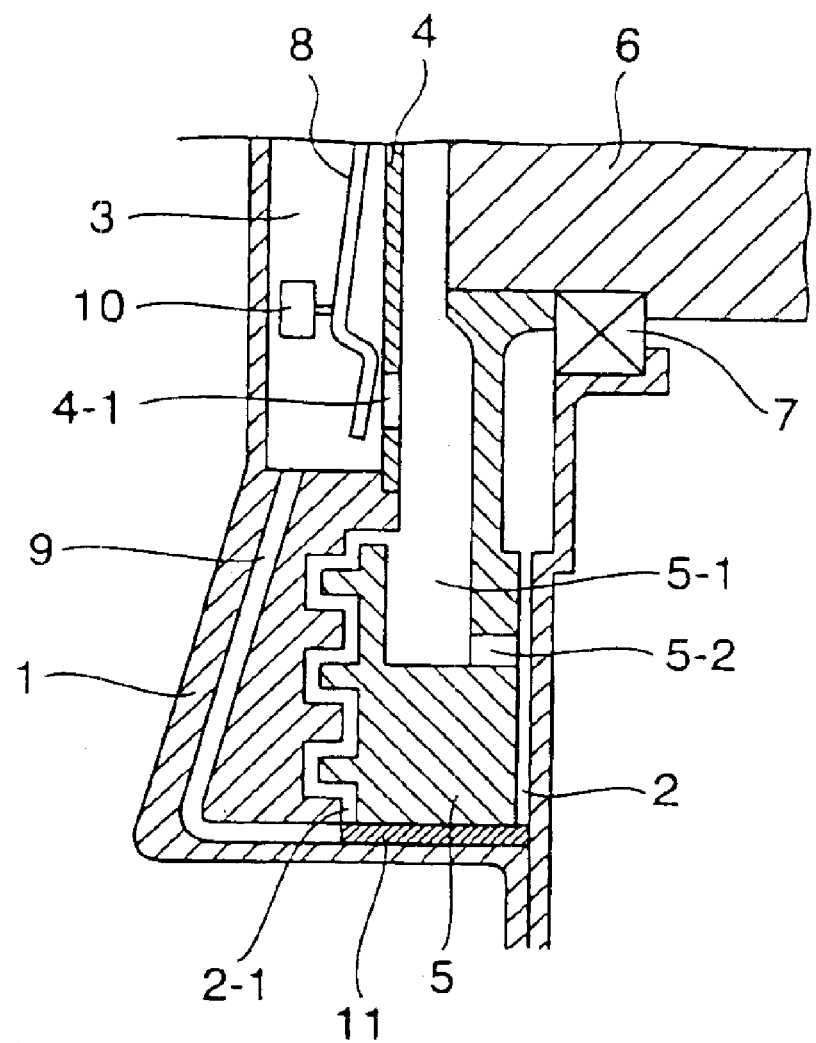
FIG. 2 is a longitudinally sectioned side elevation showing another embodiment of the temperature sensitive fan coupling apparatus according to the present invention.
Figure 3:
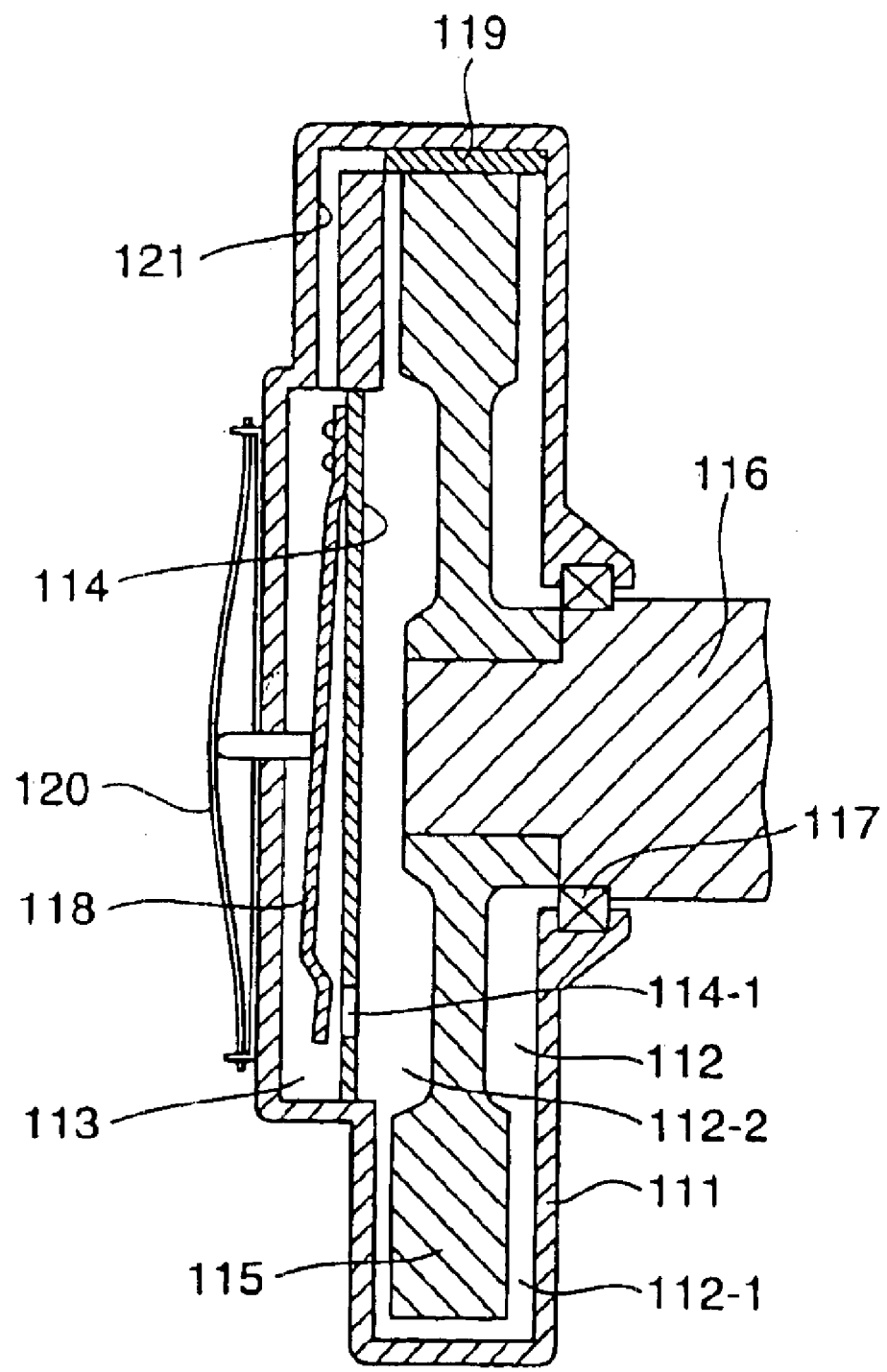
FIG. 3 is a longitudinally sectioned side elevation showing a principal portion of an example of a general related art fan coupling apparatus.
Figure 4:
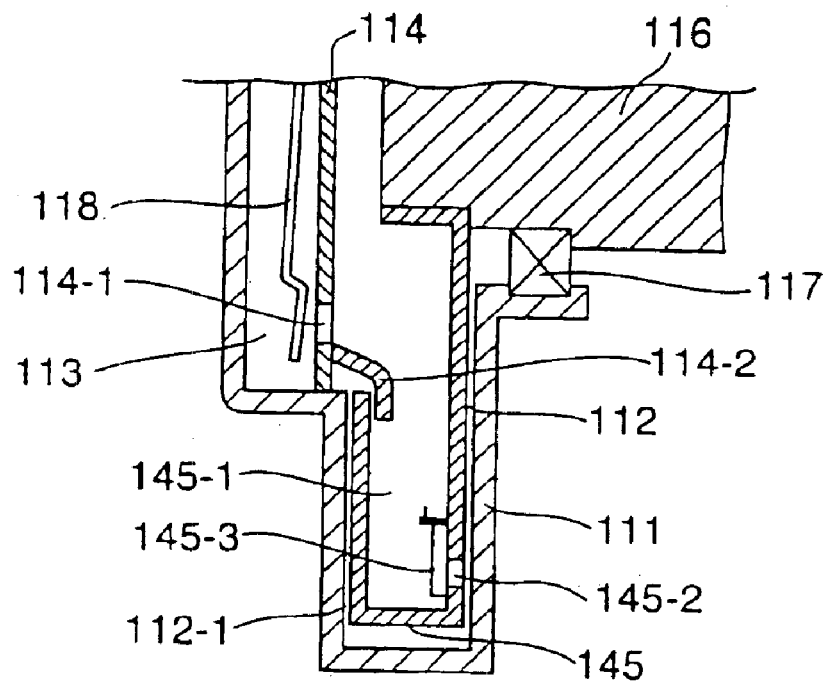
FIG. 4 is a longitudinally sectioned side elevation showing a principal portion of an example of a related art fan coupling apparatus having a driving disk of a hollow structure.
Figure 5:
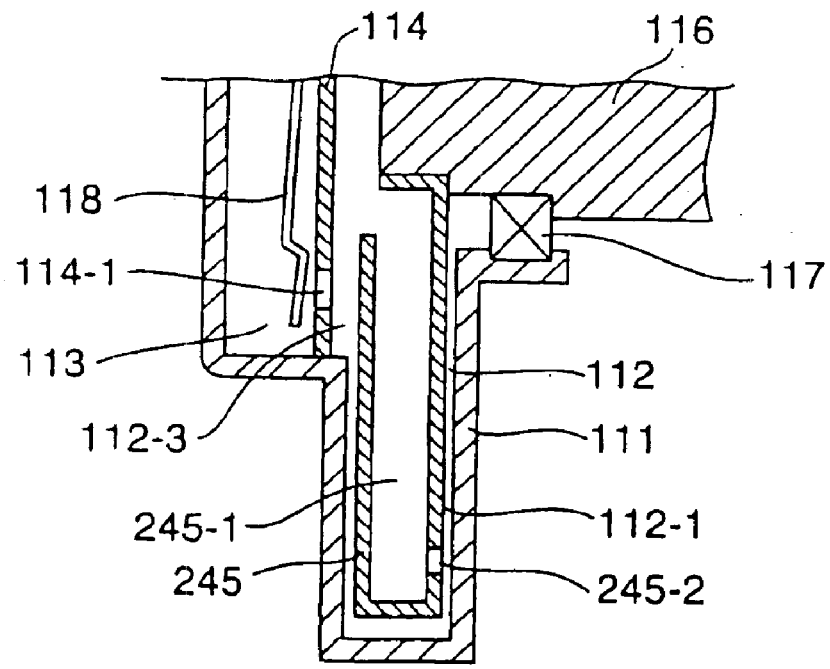
FIG. 5 is a longitudinally sectioned side elevation showing a principal portion of another example of the related art fan coupling apparatus having a driving disk of a hollow structure.
Figure 6:
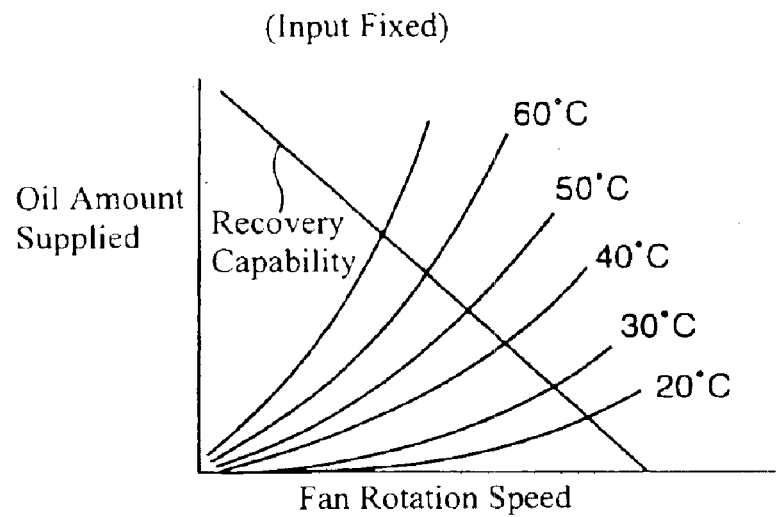
FIG. 6 is a diagram showing the temperature sensitive characteristics of an ON/OFF type fan coupling apparatus.
Figure 7:
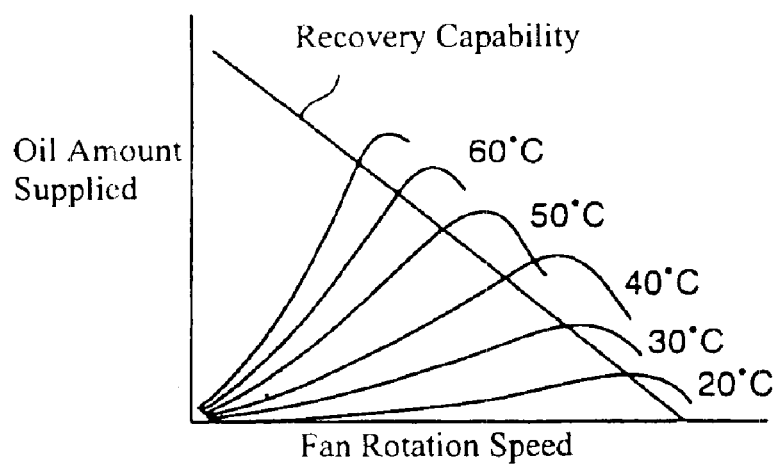
FIG. 7 is a diagram showing the temperature sensitive characteristics of a linear type fan coupling apparatus.

FIG. 1 is a longitudinally sectioned side elevation showing a basic construction of a principal portion of the temperature sensitive fan coupling apparatus according to the present invention, and FIG. 2 a longitudinally sectioned side elevation showing a principal portion of another embodiment of the temperature sensitive fan coupling apparatus according to the present invention.

According to the present invention, the basic construction of which is as shown in FIG. 1, the interior of the sealed case 1 is divided by the partition 4 into the torque transfer chamber 2 and oil reservoir chamber 3. The torque transfer chamber 2 is provided therein with the driving disk 5 which has the idle oil reservoir chamber 5-1 formed by making an inner portion of the disk hollow, and communication port 5-2 formed in a side wall of the disk and communicating with the torque transfer chamber 2. The driving disk 5 is mounted rotatably via a bearing 7 on the rotary shaft body 6, which is rotated by a driving force of a driving unit (not shown), in such a manner that the torque transfer clearance 2-1 is formed between the driving disk 5 and the inner circumferential surface of the torque transfer chamber 2. According to the present invention, a communication port 5-2 is provided in the position (closer to the inner circumference of the torque transfer clearance 2-1) which satisfies the above-mentioned conditions, i.e., 0.05L<d<0.4L.

This embodiment is formed by also providing therein a mechanism for introducing the oil in the oil reservoir chamber 3 from the outflow regulating port 4-1 provided in the partition 4 into the idle oil reservoir chamber 5-1 of the driving disk 5 directly by the valve member 8 which is operated by a bimetal and an external electromagnetic coil in accordance with the variation of an external ambient temperature, the oil in the idle oil reservoir chamber 5-1 being supplied from the communication port 5-2 into the torque transfer chamber 2, the oil in which is returned to the oil reservoir chamber 3 through the circulating passage 9. The reference numeral 10 denotes a counterweight, and 11 denotes a dam.

During the operation of the fan coupling apparatus of the above-described construction, the oil flowing out from the out from the outflow regulating port 4-1 of the partition 4 is introduced directly into the idle oil reservoir chamber 5-1 of the hollow driving disk 5. The oil in this idle oil reservoir chamber 5-1 is introduced smoothly from the communication ort 5-2 into the torque transfer clearance 2-1 by a large centrifugal force owing to the high rotational speed of the rotary shaft body 6. Since the communication port 5-2 is provided closer to the inner circumference of the torque transfer clearance 2-1, the distance between this communication ort 5-2 and the circulating passage 9 communicating with the oil reservoir chamber 3 is long. Therefore, the oil introduced from the communication port 5-2 generates torque corresponding to the proper quantity of oil supplied from the oil reservoir chamber.

Namely, in the case of the fan coupling apparatus according to the present invention, a proper quantity of oil flows out from the outflow regulating port 4-1 of the partition 4 owing to the counterweight 10, and enters the portion of interior of the driving disk 5 which is on the side of the input shaft rotating at a high speed, the oil being thereby given a high centrifugal force. Therefore, the oil obtains a high pressure stably, so that the oil in the idle oil reservoir chamber 5-1 flows easily from the communication port 5-2 into the torque transfer clearance 2-1 with the oil not residing in the chamber 5-1 even when an excess oil does not exist. Accordingly, when the portion of the driving disk which is on the side of the input shaft is rotated at a high speed, the oil does not substantially reside in the idle oil reservoir chamber 5-1, so that a drag phenomenon does not occur. Moreover, since the controlling of the rotation of the fan does not depend upon the residing oil (excess oil), the responsibility of the apparatus is improved.

Since the communication port 5-2 in the side wall of the idle oil reservoir chamber 5-1 is provided in the portion of the torque transfer clearance 2-1 which is closer to the inner circumference thereof, the oil in the idle oil reservoir chamber 5-1 flows stably into the torque transfer clearance 2-1. Therefore, the linear characteristics are obtained without spoiling the drag performance. This causes the noise of the fan to decrease greatly.

The modes of the communication port 5-2 provided in the side wall of the idle oil reservoir chamber 5-1 include a system in which a communication port 5-2 is provided in a torque transfer wall on one side of the driving disk 5, a system in which communication ports 5-2 are provided in torque transfer walls on both sides of the driving disk 5, and a system in which the communication port is made cross-sectionally long or elliptic so as to increase the cross-sectional area thereof.

The temperature sensitive fan coupling apparatus shown in FIG. 2 is obtained by forming the torque transfer clearance between the driving disk 5 and the opposed wall surface of the sealed case 1 on the driven side to a labyrinth structure instead of using a flat plate type disk, and the operation and effects of this apparatus are identical with those of that shown in FIG. 1.

As described above, in the temperature sensitive fan coupling apparatus according to the present invention, the oil flowing out from the outflow regulating port of the partition enters the portion of the interior of the idle oil reservoir chamber of the driving disk which is on the side of the input shaft rotating at a high speed, and a high centrifugal force is thereby given to the oil, so that the oil obtains a stable and high pressure. Therefore, even when an excess oil does not exist, the oil in the driving disk flows easily into the torque transfer clearance in accordance with the high-speed rotation of the driving disk with the oil not residing in the same disk. Accordingly, the following various excellent effects are produced. The oil does not substantially reside in the driving disk. The prevention of a guided rotation phenomenon at the engine starting and accelerating time and an operation delay is effected. Since the controlling of the rotation of the fan does not depend upon the residing oil (excess oil), the responsibility of the apparatus with respect to a temperature indication is improved, and controlling the rotation of the fan stably (stabilizing the temperature characteristics) becomes possible. Since the excess oil does not substantially exist, and since the communication port for making the oil flow from the interior of the driving disk into the torque transfer clearance is provided in a proper position in the portion of the torque transfer unit which is closer to the inner circumference thereof, the linear characteristics can be obtained easily in a wide rotational speed zone without spoiling the drag performance.

What is claimed is:

1. A temperature sensitive fluid type fan coupling apparatus having a sealed case supported via a bearing on a rotary shaft body on a front end portion of which a driving disk is mounted firmly, the interior of the sealed case being divided by a partition, which has an oil outflow regulating port therein, into an oil reservoir chamber and a torque transfer chamber in which the driving disk is housed, a circulating flow passage being formed which extends from the torque transfer chamber, which is joined to a dam provided on a part of an inner circumferential wall surface of the sealed case, to the oil reservoir chamber, a valve member being provided which is adapted to open the outflow regulating port of the partition when an external ambient temperature exceeds a set level, and close the out flow regulating port when the external ambient temperature is not higher than the set level, the transfer of the rotary torque from the rotary shaft body toward the sealed case on the driven side being controlled by increasing and decreasing an effective contact area of oil in the driving disk and a torque transfer clearance, wherein a side wall of an idle oil reservoir chamber, which is formed by making an inner portion of the driving disk hollow, is provided with at least one communication port communicating with the torque transfer clearance, a mechanism in which the oil in the oil reservoir chamber is introduced from the outflow regulating port of the partition directly into the interior of the idle oil reservoir chamber, the communication port being provided in a position satisfying the following condition:

$$0.05L < d < 0.4L$$

wherein $L = R_{out} - R_{in}$; $d$ is a distance between an inner diametrical position of the torque transfer clearance and an axis of the communication port; $R_{out}$, a radius of an outer circumference of the driving disk; and $R_{in}$, a radius of an inner diametrical position of the torque transfer clearance.

2. A temperature sensitive fluid type fan coupling apparatus comprising a rotary shaft, a sealed case mounted rotatably to the rotary shaft by a bearing, a partition in the sealed case and dividing the sealed case into an oil reservoir chamber and a torque transfer chamber, an outflow regulating port formed in the partition for providing communication between the oil reservoir chamber and the torque transfer chamber, a valve disposed in proximity to the outflow regulating port and being operative for opening the outflow regulating port in response to sensed temperature conditions, a circulating passage extending from the torque transfer chamber to the oil reservoir chamber, a driving disk fixed to the rotary shaft and disposed in the torque transfer chamber, the driving disk having an outer circumference with a radius Rout, a torque transfer clearance defined between portions of the driving disk and the sealed case, the torque transfer clearance extending in from the outer circumference of the driving disk to an inner position having a radius Rin, an inwardly open idle oil reservoir chamber disposed in the driving disk outwardly of the outflow regulating port, and a communication port formed in the driving disk and extending directly between the idle oil reservoir chamber and the torque transfer chamber, a central axis of the communication port being spaced outwardly from the inner position of the torque transfer clearance by a distance d selected to satisfy the condition 0.05L<d<0.4L, where L=Rout-Rin.

3. The temperature sensitive fluid type fan coupling apparatus of claim 2, wherein the communication port is disposed at an outer extreme of the idle oil reservoir chamber.

4. A temperature sensitive fluid type fan coupling apparatus comprising a rotary shaft, a sealed case mounted rotatably to the rotary shaft by a bearing, a partition in the sealed case and dividing the sealed case into an oil reservoir chamber and a torque transfer chamber, an outflow regulating port formed in the partition for providing communication between the oil reservoir chamber and the torque transfer chamber, a valve disposed in proximity to the outflow regulating port and being operative for opening the outflow regulating port in response to sensed temperature conditions, a circulating passage extending from the torque transfer chamber to the oil reservoir chamber, a driving disk fixed to the rotary shaft and disposed in the torque transfer chamber, the driving disk having an outer circumference, a torque transfer clearance defined between the driving disk and the sealed case, the torque transfer clearance extending between the outer circumference of the driving disk and an inner position spaced inwardly on the driving disk a distance L from the outer circumference of the driving disk, an inwardly open idle oil reservoir chamber disposed in the driving disk at a radial position outward of the outflow regulating port, and a communication port formed in the driving disk and extending directly between the idle oil reservoir chamber and the torque transfer chamber, a central axis of the communication port being spaced outwardly a distance d from the inner position of the torque transfer clearance to satisfy the relationship 0.05L<d<0.4L.

5. The temperature sensitive fluid type fan coupling apparatus of claim 4, wherein the communication port is disposed at an outer extreme of the idle oil reservoir chamber.

* * * * *